United States Patent [19] — Woudsma

[11] Patent Number: 5,052,333
[45] Date of Patent: Oct. 1, 1991

[54] PLUG

[76] Inventor: Jacob Woudsma, Vogezenlaan 23, 5701 PX Venray, Netherlands

[21] Appl. No.: 261,969
[22] PCT Filed: Feb. 23, 1987
[86] PCT No.: PCT/NL87/00005
§ 371 Date: Aug. 31, 1988
§ 102(e) Date: Aug. 31, 1988
[87] PCT Pub. No.: WO87/05251
PCT Pub. Date: Sep. 11, 1987

[30] Foreign Application Priority Data
Mar. 3, 1986 [NL] Netherlands ............ 8600528

[51] Int. Cl.$^5$ ............ B05C 1/00
[52] U.S. Cl. ............ 118/100; 118/200; 118/205; 118/215; 144/330; 156/94; 156/98
[58] Field of Search ............ 144/330; 156/94, 98; 118/200, 100, 205, 214, 215; 427/291

[56] References Cited

U.S. PATENT DOCUMENTS

| 2,570,588 | 6/1951 | Nylund | 144/330 |
| 3,896,627 | 7/1975 | Brown | 405/261 |
| 4,055,051 | 10/1977 | Finney | 405/261 |
| 4,322,183 | 3/1982 | Ciavatta | 405/261 |
| 4,516,886 | 5/1985 | Wright | 405/261 |
| 4,518,292 | 5/1985 | Calandria | 405/261 |
| 4,555,206 | 11/1985 | Sweeney | 405/261 |
| 4,611,954 | 9/1986 | Cassidy | 405/261 |
| 4,693,652 | 9/1987 | Sweeney | 405/261 |

FOREIGN PATENT DOCUMENTS

| 0125728 | 11/1984 | European Pat. Off. . |
| 0139318 | 5/1985 | European Pat. Off. . |
| 8303997 | 11/1983 | PCT Int'l Appl. . |
| 0019901 | 4/1900 | United Kingdom ............ 156/98 |

Primary Examiner—Willard E. Hoag
Attorney, Agent, or Firm—Blum Kaplan

[57] ABSTRACT

A plug of deformable material such as wood or plastic, for tightly sealing a cylindrical recess provided in wood, in which recess a crushable ampule with a wood attack combating agent can be accommodated, said ampule being attachable in a cavity of said plug by means of spring lugs, said plug being provided with a conical drive-in surface, and at least one deformable sealing clamping means being provided on said plug; the plug, at the end facing away from the drive-in end, containing a separate clamping sealing means for engaging the inner circumference of the recess, the outer radial dimensions of the sealing means and of the plug being such that complete sealing is acquired and maintained without damaging the wood after the plug has been driven into the recess, even in the event of high pressure build up in said recess.

26 Claims, 1 Drawing Sheet

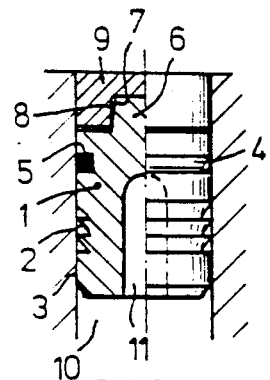
FIG.1
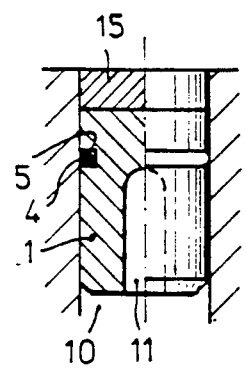
FIG.2
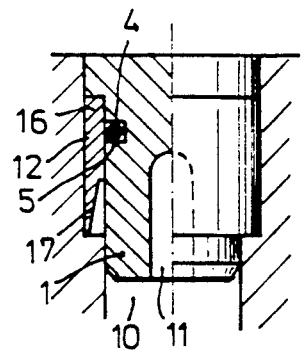
FIG.3
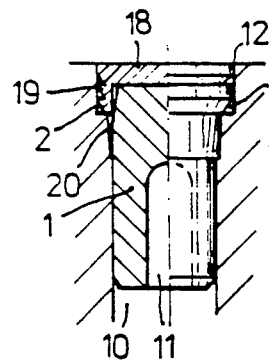
FIG.4
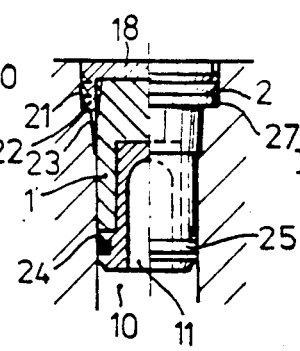
FIG.5
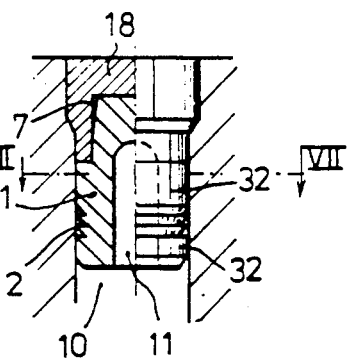
FIG.6
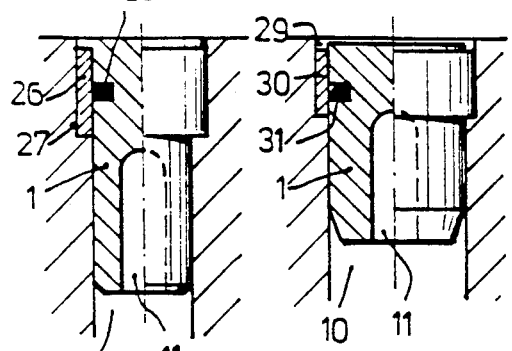
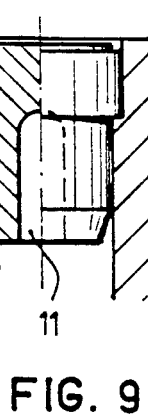
FIG.8   FIG.9
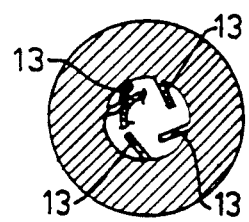
FIG.7

PLUG

The invention has reference to a plug of deformable material such as wood or plastic, for tightly sealing a cylindrical recess provided in wood, in which recess a crushable ampule with a wood attack combating agent can be accommodated, said ampule being attachable in a cavity of said plug by means of spring lugs, said plug being provided with a conical drive-in surface, and at least one deformable sealing clamping means being provided on said plug.

Such a plug is generally known. In the known plug, which is usually provided with an edge, the upper side of the plug will generally not be perpendicular to the surface of the wood when the recess is being drilled and will therefore not be flush with said surface. As a result extra expenses will have to be incurred for smooth burnishing as a preliminary operation before repainting. The eccentric location of the plug edge brings about a sealing that is not quite so good. In consequence of this, when applying liquid wood preservatives which are applied under pressure, the wood preservative may escape along the plug and come into contact with the paint, which may lead to discolouration, yellowing, soaking off or peeling off of the paint. Application to damp wood, in particular, causes the plug to become visible when the wood is drying. The sealing may not suffice when the wood is affected even slightly. If the plug is not hingeably connected to the ampule, the ampule may break too soon, before sealing has taken place. The use of plugs with too large a diameter will cause the wood, especially dry wood, to split. When using sawtooth-shaped ribs or clamping means, of which the sloping surface forms an angle larger than 45° with the horizontal, the wood is deformed and damaged, as a result of which this may serve as a guide-way for the wood preservative liquid and leakage may occur.

It is the object of the invention to remove the above-described objections and to that end the invention is characterized in that the plug, at the end facing away from the drive-in end, contains a separate clamping sealing means for engaging the inner circumference of the recess, the outer radial dimensions of the sealing means and of the plug being such that complete sealing is acquired and maintained without damaging the wood after the plug has been driven-in into the recess, even in the event of high pressure-build-up in said recess.

In several embodiments of the present device the plug can move as a kind of hinge, by which the plug always flushes with the surface of the wood without drilling, perpendicular to said wood surface, having to take place. Two spring, sawtooth-shaped clamping means with different diameters, of which the sloping surface forms an angle smaller than or equal to 45° with the horizontal, are applied, said spring clamping means deforming when they are driven-in into the wood, as a result of which warping of the plug is prevented. When applying a clamping jacket good sealing is obtained before the ampulla is crushed and its contents are released. The use of a clamping jacket with or without a cap, and provided with a tapered drive-in surface, serves for a seal between the transition of two recesses with different diameters. An O-ring, which is arranged in a circumferential groove of the plug, is used for sealing in hard types of wood and for wood weakened by attack. By slightly countersinking the plug with ampule or an impregnated plug, the finishing operation can take place by means of a round wooden disk that can follow the surface of the wood, thus preventing the plugs from becoming visible. The difference between the outer diameter of the plug and the inner diameter of one of the drilled holes is 1 mm at the most. If this difference in diameter should be larger than 1 mm, then cracks will appear in the wood and premature glass-breakage will occur when driving-in takes place. The same type of disk is applied to each type of wood, so that, especially when using transparant paint, which causes the structure of the wood to remain visible, an esthetic finish is the result. For the cap laminated wood is preferably used. The plug may also be made of laminated wood. The O-ring, mentioned above, is preferably located at the end of the plug facing away from the drive-in end of said plug, because, after the ampule has been crushed, the seal still has to move when driving-in has taken place, in connection with the proper crushing of the glass ampule.

By applying the present invention a number of seals, placed one after the other, are obtained in the direction of the surface of the wood, which seals, when applying mutually different materials for plug and clamping jacket with or without a cap, bring about a permanent complete seal and maintain it without the wood around the recess being damaged. Such damage (splits, chip formation in the wall of the recess) would result in leakage of the wood attack combating agent.

It is finally remarked that the applied synthetic material may be reinforced with glass in order to avoid stripping-up of the outer wall of the clamping jacket. At the open end of the drilled hole the inner wall of the drilled hole may be provided with a layer of primer or the like before the plug is driven-in, through which a gas tight high pressure seal is obtained, in particular. Furthermore, the outer diameter of the wooden plug should be equal to the outer diameter of the drive-in end of a cap which, at that end, has an outer diameter which is smaller than that of the opposite end of the cap.

BRIEF DESCRIPTION OF THE DRAWINGS

The invention will be elucidated further with the aid of the drawing.

FIGS. 1 through 6 and 8 through 9 each show half an axial section and a semi-view of the various embodiments according to the invention.

FIG. 7 is an enlarged cross-sectional view of the plug of FIG. 6, taken along line VII—VII.

A plug 1 according to FIG. 1 contains a plurality of sawtooth-shaped clamping means 2 having various radial dimensions, a guiding edge 3 being provided at one side of said clamping means and an O-ring 4 being provided in a circumferential groove 5 at the other side. At the end facing away from the drive-in end, the plug is provided with a central pin 6 which has a bevelled edge 7 at its end. The pin 6 fits in a cavity 8 of a cylindrical wooden disk 9 which, on account of the bevel, can pivot around the pin 6 so that, when a drilled recess 10 in the wood is not perpendicular to the surface of the wood, the disk is able to adjust itself to a slight degree so that it is flush with the surface of the wood. The plug is furthermore provided with a cavity 11 for accommodating and attaching an ampulla by means of spring lugs 13 (FIG. 7).

FIG. 2 shows a plug which is made of wood and which contains a circumferential groove 5 for accommodating an O-ring 4. A sealing means 15, forms the end sealing, of which structure, colour and the like are adapted to that of the surface of the wood.

In FIG. 3 the plug 1 also has a T-shaped axial section. In the broadened portion 12 a clamping jacket 16 is provided which has a tapered inner wall portion 17 at the inner circumference of its drive-in end in order to form a space that is filled with wood when the clamping jacket is driven-in, after which the plug 1 is driven-in. The clamping jacket engages an O-ring accommodated in a circumferential groove 5.

FIG. 4 shows a plug that is provided with a cap 18 and a clamping jacket 19 forming part of said cap, on which clamping jacket a plurality of sawtooth-shaped clamping means 2 are provided. The clamping jacket 19 is provided with a tapered drive-in end 20 and is located in the broadened portion 12 of the recess 10. The plug has a bevel at the end for accommodating the cap, so that the cap can tilt with respect to the plug.

In the plug 1 of FIG. 5 a sawtooth-shaped clamping means 2 is provided on the clamping jacket 21 of the cap 18, as well as an adjacent bevelled cylindrical collar 22. The clamping jacket 21 is provided with a drive-in end 23. On the drive-in end of the plug a circumferential groove 24 is provided in which an O-ring is located. At the accommodating end of the cap the plug has a bevel for hingeably accommodating the cap 18.

Plug 1 of FIG. 6 is similar to plug 1 of FIG. 5 except at the drive-in end the plug 1 of FIG. 6 contains a plurality of sawtooth-shaped clamping means 2, limited by guiding surfaces 32 and 33.

. At the drive-in end the plug 1 of FIG. 6 contains a plurality of sawtooth-shaped clamping means 2, limited by guiding surfaces 32 and 33. The plug, at its accommodating end for the hingeable cap 18, has a bevel.

The plug 1 according to FIG. 8 has a T-shaped axial section, the clamping jacket 26 being accommodated in a broadened portion 37 of the recess 10. The inner side of the clamping jacket engages an O-ring 28 provided in a circumferential groove of the plug.

The plug 1 illustrated in FIG. 9 has a substantially rectangular axial section, the clamping jacket 30 being accommodated in the broadened portion 29 of the recess 10, the inner side of said clamping jacket engaging an O-ring 31 provided in a circumferential groove of the plug, both the clamping jacket and the plug extending until below the surface of the wood. The space above the plug is filled with a sealing material to the surface of the wood.

It is preferable to provide resilient lugs (13) as shown in FIG. 7 said lugs extending from the inner wall of the cavity for attachment of the ampule (not shown) into said cavity and in its longitudinal direction.

The sloping surfaces on the sawtooth-shaped clamping means form an angle, which is smaller than or equal to 45°, with the horizontal.

The taper of the drive-in end of a clamping means, for instance as shown in FIG. 4, no. 20, lies between 90°-96° with respect to a surface perpendicular to the central axis of the plug. As synthetic material for the clamping jacket and the cap PVC or ABS is used. These materials are well-suited for repainting and they swell when they come into contact with organic and inorganic liquids.

I claim:

1. A plug formed of a deformable material such as wood, synthetic material or the like, for clampingly sealing a recess in wood, having a first end to be driven in the recess and a second outer end opposite thereto, the plug comprising: a cavity for accommodating a crushable ampule or holder with a wood preservative; and a plurality of separate, cooperating clamping sealing means for engaging an inner wall of the recess, at least two of the clamping sealing means positioned at the second outer end of the plug, the clamping sealing means being mutually movable so that the sealing means positioned closest to the wood seals flush with the wood surface, and prior to driving the plug in the recess, an outer radial dimension of at least one of the sealing means is greater than the internal radial dimension of a corresponding accommodating portion of the recess to such an extent that, after the plug has been driven into the recess, no damage to the wood or leakage of the wood preservative occurs.

2. The plug of claim 1, wherein the clamping means are sawtooth-shaped and have various outer diameters.

3. The plug of previously added claim 1, further including a plurality of lugs for attaching the ampule in the plug, the lugs extending from the inner wall of the cavity into the cavity in a longitudinal direction.

4. The plug of claim 1, wherein the first end of the plug is tapered, and the taper with respect to a surface perpendicular to the central axis of the plug is between about 90° and 96°.

5. The plug of claim 1, wherein the difference between the outer diameter of the plug and the inner diameter of the recess is 1 mm.

6. The plug of claim 1, wherein the inner wall of the recess at the open end, includes a layer of primer or the like.

7. The plug of claim 1, wherein the outer diameter of the wooden plug is equal to the outer diameter of the end of the cap-shaped sealing means nearest the first end of the plug, and the cap-shaped sealing means having an outer diameter at said end smaller than the outer diameter at an opposite end of the cap-shaped sealing means.

8. The plug of claim 1 wherein the outer diameter of the sealing means is equal to the inner diameter of an end of the cap-shaped sealing means nearest the first end of the plug, the cap-shaped sealing means having an outer center line at said end smaller than the outer center line at the opposite end.

9. The plug of claim 1, wherein one of the separate cooperating clamping sealing means has the shape of a cylindrical wooden disc for providing a flat clamping end which seals the open end of the recess.

10. The plug of claims 1 or 9, wherein the plug is formed of wood and is cylindrical and includes a circumferential groove for accommodating an O-ring.

11. The plug of claim 9, wherein the disc is formed of multi ply wood.

12. The plug of claims 1 or 9, wherein the clamping means are sawtooth-shaped and the plug further includes a guide edge between the clamping means and the first end, an O-ring positioned in a circumferential groove between the clamping means and the second end and a cylindrical disc having a central cavity for accommodating a central pin with a bevelled edge.

13. The plug of claim 12, wherein each of the sloping surfaces of the sawtooth-shaped clamping means form an angle, smaller than or equal to 45°, with the horizontal.

14. The plug of claim 1, wherein one of the separate cooperating clamping sealing means is a cylindrical clamping jacket that is positioned on the outer circumference side of the plug.

15. The plug of claim 14, wherein the plug has a T-shaped axial section and the clamping jacket includes a conical inner wall portion at the inner circumference of the first end of the plug, the clamping jacket engaging an O-ring positioned in a circumferential groove of the plug.

16. The plug of claim 14, wherein the plug includes a T-shaped axial section, and the inner side of the clamping jacket is connected to an O-ring positioned in a circumferential groove of the plug.

17. The plug of claim 14, wherein the clamping means includes a substantially rectangular axial section, and the clamping jacket is accommodated at the broadened portion of the section, the inner side of the clamping jacket connected to an O-ring positioned in a circumferential groove of the plug, both the clamping jacket and the plug extending under the surface of the wood.

18. The plug of claim 14, wherein the cylindrical clamping jacket is integrated in a cap-shaped, clamping sealing means that is pivotable onto the first end of the plug, the first end including a bevel.

19. The plug of claim 18, wherein the clamping means are sawtooth-shaped and the clamping means are positioned on the clamping jacket which is tapered toward the first end of the plug.

20. The plug of claim 18, wherein the clamping means are sawtooth-shaped and the clamping means are positioned on the cap-shaped sealing means, the cap-shaped sealing means including a cylindrical collar including a bevel, said sealing means tapered towards the first end of the plug, and the plug further including an O-ring positioned in a circumferential groove.

21. The plug of claim 18, wherein the clamping means are sawtooth-shaped and the clamping means are positioned near the first end of the plug and are defined by guiding surfaces the plug including a bevel for accommodating the pivotable cap-shaped sealing means.

22. The plug of claim 18, wherein the clamping jacket and the cap-shaped sealing means are formed of a synthetic material and the synthetic matter PVC.

23. The plug of claim 18, wherein the clamping jacket and the cap-shaped sealing means are formed of ABS.

24. The plug of claim 18, wherein when the clamping means and the cap-shaped sealing means are formed of synthetic material, the synthetic material is reinforced with glass.

25. The method of applying a preservative to wood comprising:

driving a deformable plug into a recession in a piece of wood, said plug having a first end to be driven into the recess and a second outer end opposite thereto, the plug defining a cavity accommodating a crushable ampule containing a wood preservative and having a plurality of separate cooperating clamping and sealing means engaging a wall defining the recess, at least two of the clamping and sealing means being positioned at the second outer end of the plug, the clamping and sealing means being mutually movable so that the sealing means positioned closest to the wood seals flush with the wood surface and prior to driving the plug into the recess, an outer radial dimension of at least one of the sealing means is greater than the internal radial dimension of a corresponding accommodating portion of the recess to such an extent that after the plug has been driven into the recess no damage to the wood outer surface or leakage of the wood preservative outside of the recess occurs; and applying a coating material on a wood surface defining the recess before driving the plug into the wood.

26. The method of claim 25, including crushing the ampule to release the wood preservative within the recess.

* * * * *